United States Patent
Kusunoki et al.

(10) Patent No.: US 6,320,324 B1
(45) Date of Patent: Nov. 20, 2001

(54) THIN-FILM ELECTRON SOURCE AND DISPLAY PRODUCED BY USING THE SAME

(75) Inventors: Toshiaki Kusunoki, Tokorozawa; Mutsumi Suzuki, Kodaira, both of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/646,156
(22) PCT Filed: Mar. 19, 1998
(86) PCT No.: PCT/JP98/01184
  § 371 Date: Sep. 14, 2000
  § 102(e) Date: Sep. 14, 2000
(87) PCT Pub. No.: WO99/48123
  PCT Pub. Date: Sep. 23, 1999
(51) Int. Cl.$^7$ ..................................... G09G 3/10
(52) U.S. Cl. ................... 315/169.3; 315/169.1; 315/169.4
(58) Field of Search ............... 315/169.1, 169.3, 315/169.4

(56) References Cited

U.S. PATENT DOCUMENTS

| | | | |
|---|---|---|---|
| 5,384,517 | * | 1/1995 | Uno .................................. 315/169.3 |
| 5,866,988 | * | 2/1999 | Oda .................................. 315/169.1 |
| 5,874,808 | * | 2/1999 | Busta et al. ....................... 315/169.1 |

FOREIGN PATENT DOCUMENTS

| | | | |
|---|---|---|---|
| 7-226146 | 8/1995 | (JP) | .................................. H01J/1/30 |
| 8-31302 | 2/1996 | (JP) | .................................. H01J/1/30 |

OTHER PUBLICATIONS

Journal Vacuum Science & Technology, A 10(5), Sep./Oct. 1992, pp. 2991–2995.

* cited by examiner

Primary Examiner—Don Wong
Assistant Examiner—Jimmy T Vu
(74) Attorney, Agent, or Firm—Mattingly, Stanger & Malur, P.C.

(57) ABSTRACT

This relates to a thin-film type electron source having a structure of a lower electrode 11, an insulating layer 12 and an upper electrode 13 being laminated in such order, for emitting electron from a surface of the upper electrode 13 into a vacuum, upon application of voltage between the lower electrode 11 and the upper electrode 13, in a polarity thereof so that the upper electrode 13 is positive in the voltage.

In the above, as the insulating layer 12, being made from anodized film of Al-alloy lower electrode 11, is used one which has a ratio of a reverse direction diode current when applying an electric field of 10 MV/cm thereacross in a reverse direction, with respect to a forward direction diode current when applying an electric field of 10 MV/cm thereacross in a forward direction so as to cause emission of electron therefrom, being equal to or greater than 0.12, when it is converted into a case where height of barrier of the insulating layer 12 to the lower electrode 11 is equal to that of the upper electrode 13.

Due to the above, improvement in symmetry is proceeded on the asymmetry of the current-voltage characteristic curve of the insulating layer 12, thereby elongating the life time of the thin-film type electron source.

11 Claims, 10 Drawing Sheets

FIG. 1

(a) FORWARD BIAS    (b) REVERSE BIAS

FORWARD BIAS            REVERSE BIAS

THIN-FILM ELECTRON SOURCE AND DISPLAY PRODUCED BY USING THE SAME

TECHNICAL FIELD

The present invention relates to a thin-film electron source and a display device by using the same, having three-layer structure of metal-insulator-metal, for emitting electron into a vacuum therefrom.

BACKGROUND ART

Figure 2:
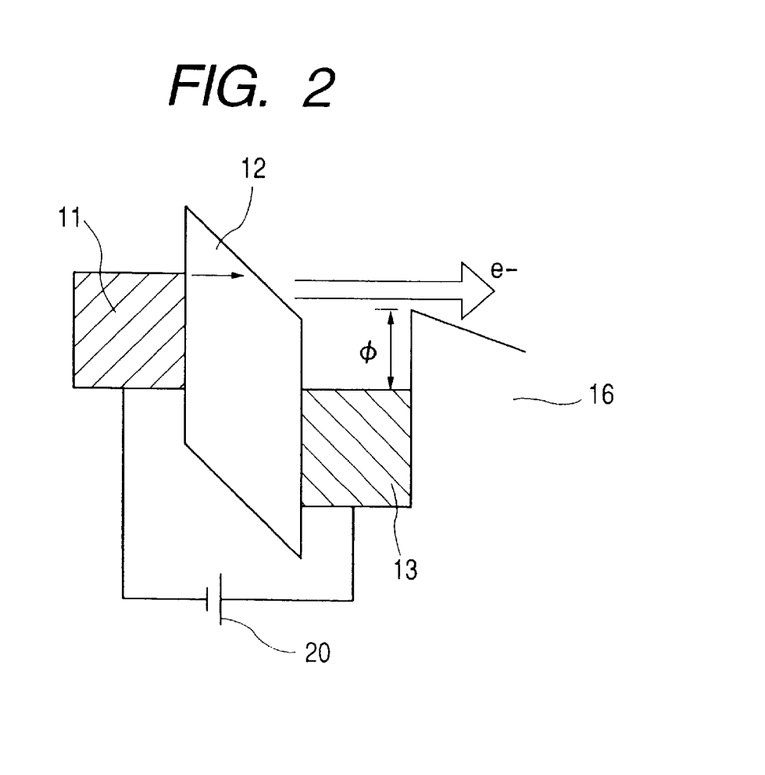
FIG. 2 is an explanatory view for the operation principal of the thin-film electron source.

A thin-film electron source has three-thin-layer structure, such as an upper electrode-an insulating layer-a lower electrode, and it emits electron into a vacuum from the surface of the upper electrode, by applying voltage between the upper electrode and the lower electrode, having such a polarity that the upper electrode comes to have a positive one. The operation principle of the thin-film electron source is shown in FIG. 2. A driving voltage 20 is applied across the upper electrode 13 and the lower electrode 11, so as to establish the electric field of around 10 MV/cm within the insulating layer, then electron in the vicinity of the Fermi level within the lower electrode 11 penetrates through the barrier due to the Tunnel phenomenon of Fower-Nordheim, so as to be injected into conductive bands of the insulating layer 12 and the upper electrode 13, thereby becoming hot electrons. Among those electrons, those having energy being equal to or greater than the work function $\phi$ of the upper electrode are emitted into the vacuum 16. Because of utilization of the Tunnel phenomenon, the film thickness of the insulating layer must be very thin, such as being about from 3 nm to 15 nm.

With such the thin-film electron source, it is possible to generate electron beam from any place where a matrix is formed by crossing or intersecting plural pieces of the upper electrodes and plural pieces of the lower electrodes, therefore it can be used as an electron source in a display device, or the like.

Heretofore, emission of electron was observed from MIM (Metal-Insulator-Metal) structure, such as Al—$Al_2O_3$—Au structure.

In particular, with the thin-film electron source, which uses Al as the lower electrode and anodized film (or film oxidized by anodic oxidization) as the insulating layer, since it is possible to form $Al_2O_3$ insulating layer, being durable with high voltage and having a uniform thickness due to the anodic oxidization or anodization as well, then the electron emission of good quality can be obtained.

DISCLOSURE OF THE INVENTION

A problem to be dissolved in the display device using the thin-film electron source is that the life time thereof is insufficient. Concentration of electric field at an edge portion of the three-layer structure, diffusion of the material of the upper electrode into the insulating layer, and deterioration of the insulating layer due to accumulation of electrical charge upon an interface between the insulator layer and the upper electrode, etc., are the main reasons therefor. The concentration of electric field at the edge portion was already dissolved by introduction of a thick protection insulating layer at the edge portion. The diffusion of the material of the upper electrode into the insulating layer was already dissolved by applying the material having high sublimation enthalpy as the material of the upper electrode. On the other hand, the deterioration of the insulating layer may be suppressed by a method of reversing the polarity of a driving voltage alternatively, thereby to release the electric charges accumulated one after another, therefore the property of life time thereof was improved, however it is still desired that is improved furthermore.

An aspect on which a measure should be taken for that purpose is a fact that there is a large asymmetry in the characteristic curve between current and voltage (current-voltage characteristic curve) of the insulating layer. Namely, when voltage is applied to in such the polarity that the upper electrode comes to be a positive voltage (a forward direction), thereby to cause the emission of electron, current is likely to flow in the insulating layer easily, but on the contrary to this, when voltage is applied to in such the polarity that the lower electrode comes to be a positive voltage (a reverse direction), current is reluctant to flow in the insulating layer.

This is because, when applying the voltage in the reverse direction, sufficient electric field is not applied to the insulating layer in the vicinity of the interface between the upper electrode and the insulating layer. Due to this, it is impossible to release the electric charges accumulated in the vicinity of the interface of the insulating layer between the upper electrode, even if the voltage in the reverse direction is applied thereto. Accordingly, the difference between the accumulated electric charges and the released electric charges is accumulated onto the vicinity of the interface of the upper electrode, in proportion to the continuation of the driving thereof, thereby deteriorating the insulating layer.

Figure 3:
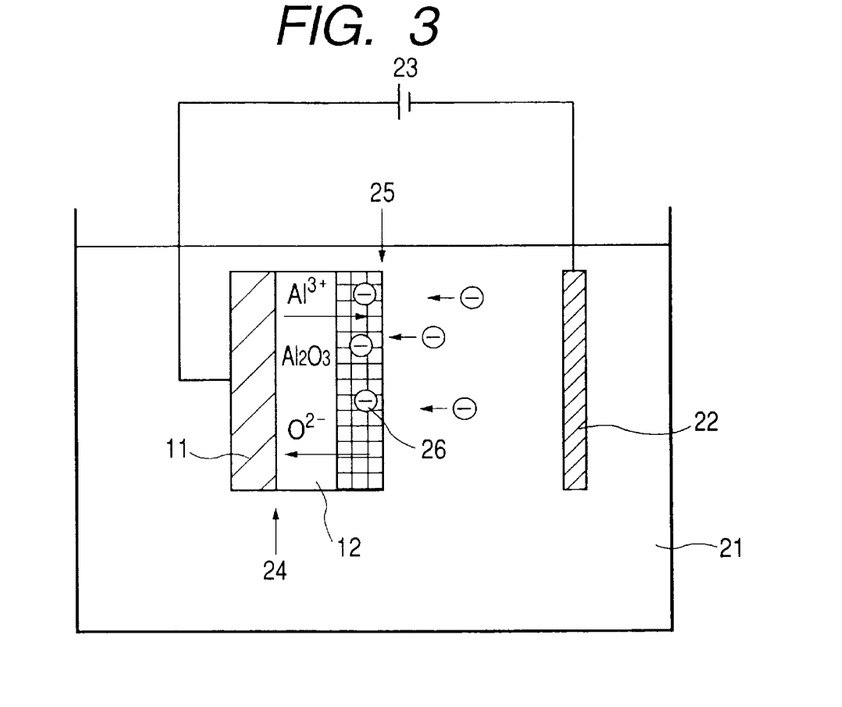
FIG. 3 is a view for explaining anodization.

One of the reasons of the asymmetry in the current-voltage characteristic curve of the insulating layer lies in ununiformity of the composition of the anodized film, in particular in the direction of thickness thereof. In FIG. 3 is shown a process for forming the anodized film, in diagrammatic manner. The anodization (or the anodic oxidization) of electrode is proceeded within electrolysis liquid 21, while applying formation voltage to a sheet electrode 22 of such as Pt, etc., as the cathode. Upon the interface of $Al_2O_3$ between Al of the lower electrode 13 and the insulating layer 12, during the anodization, oxygen ion $0_2$ supplied from the electrolysis liquid and Al react on each other, thereby proceeding the oxidization. Also, upon the interface 25 of the insulating layer 12 between $Au_2O_3$ and the electrolysis liquid 21, aluminum ion $Al^{3+}$ supplied from the Al electrode is oxidized, therefore $Al_2O_3$ grows up. In this manner, the growth of $Al_2O_3$ film, coming to be the insulating layer 12, occurs upon the two (2) interfaces, however since it grows up under the circumference of existing no impurity other than Al and O, pure $Al_2O_3$ glows up upon the interface 24 between the lower electrode and the insulating layer, on the other hand, upon the interface between the insulating layer and the electrolysis liquid, since anion 26 of an electrolyte within the electrolysis liquid 21 is attracted or drawn onto the interface, the insulating layer 17 grows up including the anion 26 as the impurity therein.

Because of the existence of the insulation layer 17 including the anion 26 as impurity therein, the voltage in the vicinity of the inter face between upper electrode and the insulation layer is suppressed when applying the voltage in the reverse direction, and it comes to be a reason that current is reluctant to flow in the reverse direction.

Other reason thereof lies in the difference of the structure, between the interfaces, one between the lower electrode and the insulation layer and the other between upper electrode and the insulation layer. The interface between the lower electrode and the insulating layer is formed through the anodization thereof, therefore it comes to have the structure of shifting from Al to $Al_2O_3$, continuously. On the other hand, the interface between the upper electrode and the insulating layer is formed from a film of the material of upper electrode through deposition in vacuum, therefore the composition shifts abruptly therein. In such the case, it is reported that the asymmetry occurs, for example in the current-voltage property (Journal of Vacuum Science And Technology A, Volume 10 (1992), p.2992).

Figure 4:
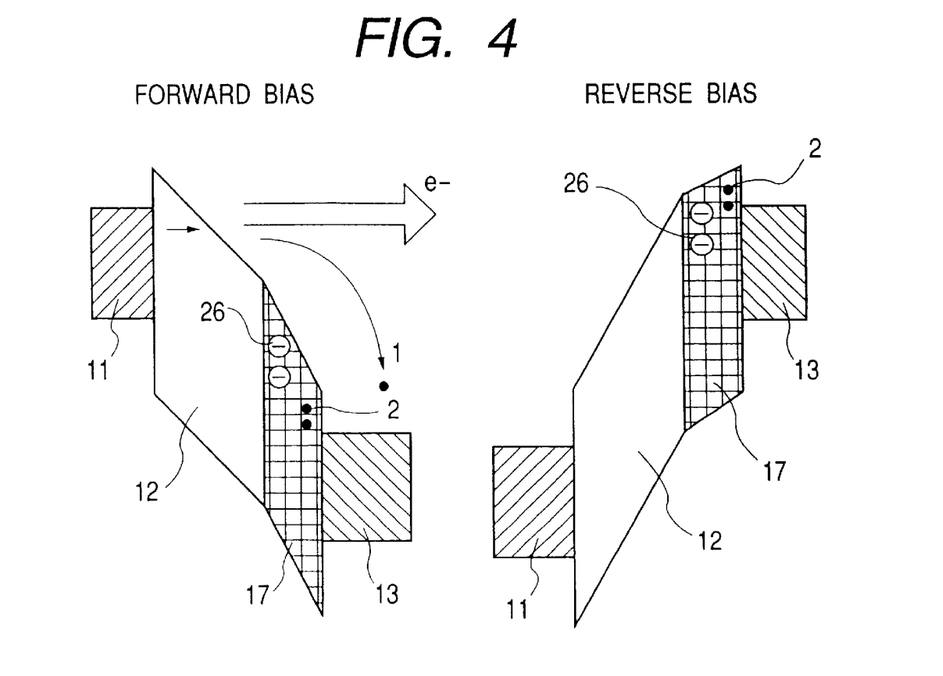
FIG. 4 is a view of the band structure under operating condition of the thin-film electron source of the conventional art.
Figure 5:
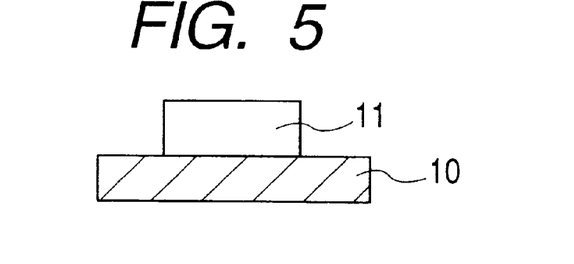
FIG. 5 is a cross-section view for showing manufacturing process of the thin-film electron source, according to a first embodiment of the present invention.

The above-mentioned is shown in the band structure when applying a forward voltage onto the conventional electron source of thin-film type and in the band structure when applying a reverse voltage onto it thereafter, in FIG. 4, collectively. When applying the forward voltage, a part of electrons injected into the insulating layers 12 and 17 from the lower electrode 11 through the Tunnel phenomenon is emitted into a vacuum (e⁻), while the remaining thereof comes to be electron 1 which flows into the upper electrode 13 and accumulated electron 2 which is accumulated on the insulating layer 17 in the vicinity of the interface between the upper electrode 13. This acculturated electron 2 comes to be the cause of the deterioration of insulation. Then, although it is desired to release the accumulated electron by applying the reverse voltage thereto, however since the insulating layer 17 in the vicinity of the interface between the upper electrode 13 contains the anion 26 therein, it is impossible to apply voltage being sufficient to release the accumulated electrons 2, therefore the accumulated electron 2 remains within the insulating layer 17.

An object according to the present invention is to realize a long life of the thin-film type electron source by proceeding symmetrization on the asymmetric property of the current-voltage characteristic curve of the insulating layer, and to provide a display device using this thin-film type electron source therein. The above-mentioned object can be achieved by a thin-film type electron source having a structure of a lower electrode, an insulating layer and an upper electrode being laminated in such order, for emitting electron from a surface of said upper electrode into a vacuum, upon application of voltage across said lower electrode and said upper electrode, in a polarity thereof so that said upper electrode is positive in the voltage, being characterized in that said lower electrode is made from Al-alloy adding metal into Al which can be anodized, while said insulating layer is made from anodized film which is anodized upon surface of said lower electrode, wherein a ratio of a reverse direction diode current when applying an electric field of 10 MV/cm thereacross in a reverse direction, with respect to a forward direction diode current when applying an electric field of 10 MV/cm thereacross in a forward direction, so as to cause emission of electron therefrom, is equal to or greater than 0.12, when it is converted into a case where height of barrier of said insulating layer to said lower electrode is equal to that of said upper electrode. It is more effective than in a case where the converted value is equal to or greater than 0.5. Here, the converted value indicates a degree of the asymmetry of the current-voltage characteristic curve of the insulating layer, and the value 1 indicates that it is in symmetry, perfectly. Also, this value may exceed the value 1. In this instance, a capability comes to be large of releasing the accumulated electric charges in the vicinity of the interface of the insulating layer between the upper electrode.

In a thin-film type electron source as defined in the above, wherein the metal which can be anodized, being added into said lower electrode, is at least one kind selected from a group including Nd, Zr, Ta, Ti, Nb and Hf.

In a thin-film type electron source as defined in the above, wherein said upper electrode is made of at least one kind selected from a group including Ir, Pt, Au, Ru, Rh, Al, Al-alloy, Ti, Cr, and conductive ITO, ZnO, $SnO_2$, $IrO_2$ and PdO.

Also, the object mentioned above can be achieved by a display device comprising: a thin-film type electron source being defined in any one of said claims from 1 to 6; a driver circuit for driving said thin-film type electron source; and a fluorescence surface which emits lights by being energized with electrons emitted from said thin-film type electron source. It is effective to use a driver circuit which applies pulse voltages of positive and negative between said lower electrode and said upper electrode. And, it is effective in the display device as defined in the above, wherein a substrate on which said thin-film type electron source is provided and a substrate on which said fluorescence surface is provided are bonded to each other through frit glass.

Further, the object mentioned above also can be achieved by a display device comprising: a thin-film type electron source; a driver circuit for driving said thin-film type electron source; and a fluorescence surface which emits lights by being energized with electrons emitted from said thin-film type electron source, wherein said thin-film type electron source has a structure of a lower electrode, an insulating layer and an upper electrode being laminated in such order, so that it emits electron from a surface of said upper electrode into a vacuum, upon application of voltage between said lower electrode and said upper electrode, in a polarity thereof so that said upper electrode is positive in the voltage, said lower electrode is made from Al-alloy adding metal into Al which can be anodized, while said insulating layer is made from anodized film which is anodized upon surface of said lower electrode, a substrate on which said thin-film type electron source is provided and a substrate on which said fluorescence surface is provided are pasted to each other through frit glass, and said bonding is conducted through heating said two (2) substrates under an atmosphere from 350° C. to 450° C. including oxygen therein.

BEST MODE FOR CARRYING OUT THE INVENTION

Embodiment 1

Figure 6:
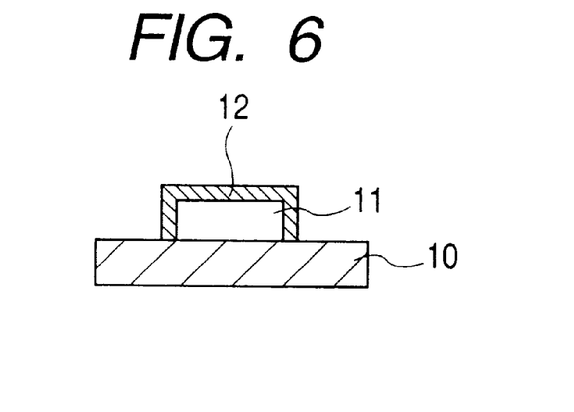
FIG. 6 is a cross-section view for showing manufacturing process of the thin-film electron source, according to the first embodiment of the present invention.
Figure 7:
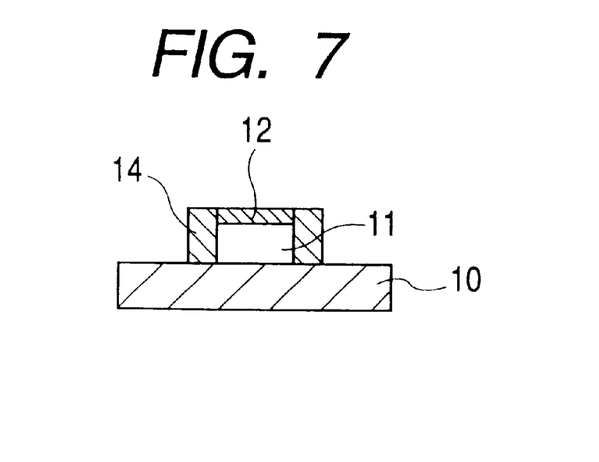
FIG. 7 is a cross-section view for showing manufacturing process of the thin-film electron source, according to the first embodiment of the present invention.

Explanation will be given on a thin-film type electron source, according to an embodiment 1 of the present invention, by referring to FIGS. 5 through 11 and FIG. 1. An Al-alloy which can be applied to the present invention contains metals, being able to be anodized (i.e., oxidized through the anodic oxidation), as additives thereof. As the additives, for example, Nd, Zr, Ta, Ti Hf, or Nb, etc., can be applied to. Also, an Al-alloy adding a plurality of those materials is effective too. For example, Al—Ti—Ta alloy can be listed up. An addition amount of those alloys is appropriate to be from 0.1% to 10%. Herein, Al—Nd alloy containing 2% of Nd is used. . . . the surface . . . is processed through the anodization (the anodic oxidation). Assuming that the formation voltage is 4 V, the insulating layer 12 of thickness of 0.5 nm is formed (FIG. 6). Next, the anodization is treated only on the side surface of the lower electrode 11 with using a mask, such as of a resist film or the like, so as to be thick selectively, thereby forming a protection insulating layer 14. Due to this, it is possible to prevent from the concentration of electric field at the edge of the lower electrode, as well as to reduce a leakage current from the side surface which does not contribute for emission (FIG. 7).

In the insulating layer 12 being formed through anodization of the surface of the Al-alloy, there are contained the additives of the materials of alloy, and Nd used in the present embodiment, as well as Ta, Hf, Ti, Zr and Nb, etc., is oxidized together with Al at the same time thereof, to be the insulator, therefore no deterioration occurs in the insulation characteristic thereof. Due to this, the leakage current is small, in the same manner when applying Al to the lower electrode 11.

Figure 8:
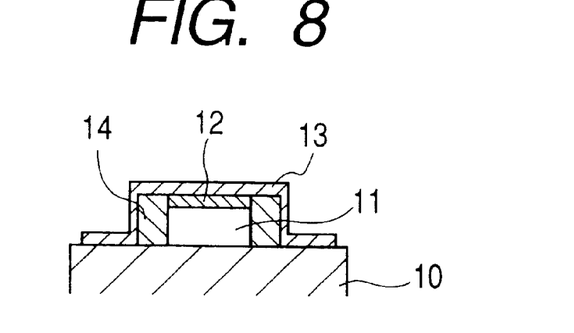
FIG. 8 is a cross-section view for showing manufacturing process of the thin-film electron source, according to the first embodiment of the present invention.

Thereafter, the upper electrode 13 is formed through the sputtering method. Herein, the upper electrode 13 is formed with a film of three-layers, i.e., Ir, Pt and Au, having high resistance to oxidation, wherein they are so constructed that onto the insulating layer comes to be contact the material Ir, having the highest sublimation enthalpy therewith, and they have the film thickness 1 nm, 2 nm and 3 nm, respectively (FIG. 8).

Figure 9:
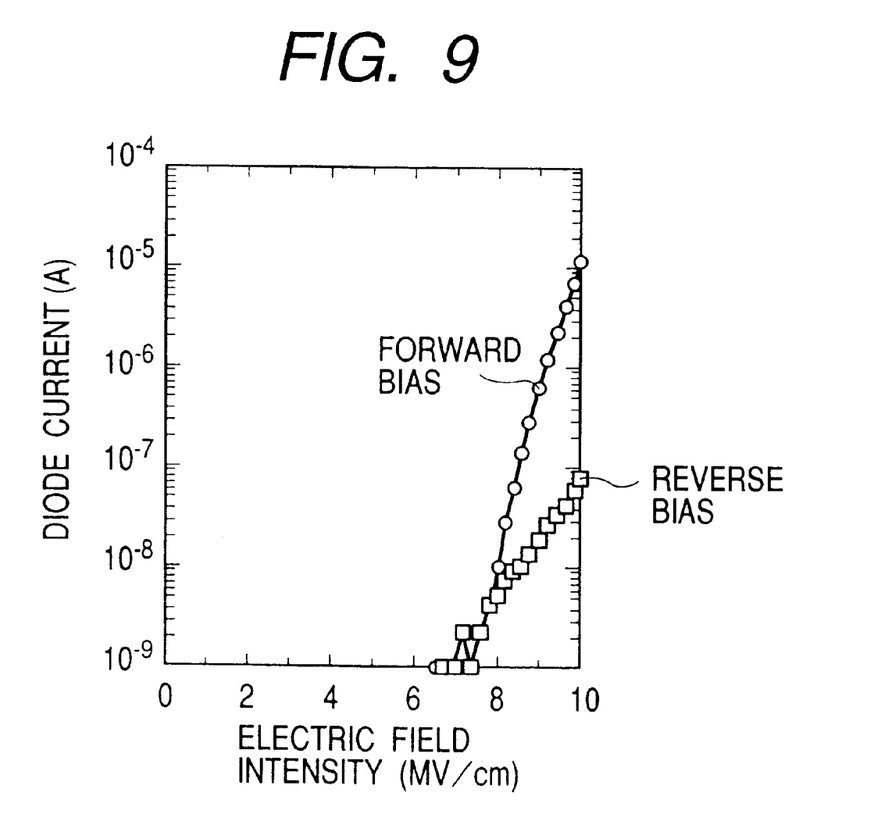
FIG. 9 shows the current-voltage characteristic curve of the thin-film electron source of a comparison example in the first embodiment of the present invention, however before treating symmetrization process on the insulation layer.

With the thin-film type electron source, just after being manufactured in this manner, the asymmetry in the current-voltage characteristic curve is large. FIG. 9 shows measurement of the current-voltage characteristic of this thin-film type electron source. A ratio of reverse direction diode current with respect to forward direction diode current is 0.0064, when applying electric field, 10 MV/cm where sufficient electron emission can be obtained. In this example, since the height of barrier of the insulating layer 12 with respect to the lower electrode 11 is different from that with respect to an upper electrode 13, it comes to be 0.12 when being converted into a case where they are equal to each other, therefore the asymmetry is low. The cause of this lie mainly in the facts, as was mentioned previously, that the anion existing within the electrolysis liquid exists within the anodized film which is in contact with the formation liquid, and that the structure of the interface is different.

For dissolving the asymmetry due to the anion, it is effective to remove it by oxidizing thereof, or to make passivation thereof.

As a kind of anion, though depending upon the electrolysis liquid to be used, organic anion is contained in a case of tartaric acid or citric acid which is used very often in the anodization of Al. In such the case, by heating under an atmosphere of temperature from 350° C. to 450° C., including oxygen therein, the anion can be removed in form of $CO_2$ and/or $H_2O$ therefrom. Also, in a case of the electrolysis liquid containing metallic acid anion therein, such as molybdic acid, etc., it may be passivated by oxidizing the metallic acid anion under the atmosphere containing oxygen therein.

While, for improving the interface structure, it is sufficient to form the interface shifting continuously in the same manner as in the interface between the lower electrode and the insulating layer, through diffusing atoms upon the interface between the upper electrode and the insulating layer to each other, by means of heating thereof. Accordingly, it is possible to improve it, at the same time when heating it for removing the anion mentioned above.

In a case when using this method, it is important that a portion of the structure of the thin-film type electron source, but other than the anodized film, is not deteriorated by the heating within the atmosphere of oxygen. Under the structure of the conventional art, since Al of the lower electrode receives the thermal stress by means of the heating thereof, hillocks are formed breaking or piercing through the insulating layer, then there occurs defect of short-circuiting between the lower electrode and the upper electrode.

According to the present embodiment, since as the lower electrode 11 is applied the Al-alloy, containing the metals which can be anodized, as the additives thereof, therefore the resistance against stress migration comes to be high and the hillocks are reluctant to grow up thereon. In particular, in the case where the surface is covered with the anodized film, release of the thermal stress is suppressed, and the hillocks are reluctant to occur, therefore the heat-resistance property can be improved. Moreover, in the heating within the atmosphere including oxygen therein, the forming of the hillocks are further suppressed due to the effect of the oxidization, and the heat-resistance property can be improved much more. Therefore, though conducting thereon the thermal process at high temperature, such as from 350° C. to 450° C., the thin insulating layer from 3 nm to 15 nm is not broken or pierced by the hillocks.

Though the Al-alloy is used in wiring of the TFT for use in the liquid crystal display for the purpose of protecting-from the hillocks, however the anodized film is thick, such as about 150 nm. This is due to the fact that the hillocks are easily formed, because the Al-alloy is heated in the vacuum for CVD deposition of amorphous Si. According to the present invention, by heating it under the atmosphere containing the oxygen therein, the generation of the hillocks can be suppressed, even with the anodized film being far thinner than 3 nm to 15 nm.

Though applying laminated or deposited films of Ir, Pt and Au onto the upper electrode 13, every one of those metals has a high oxidation-resistant property, therefore they are almost not oxidized by such the heating from 350° C. to 450° C. Accordingly, those metals are materials being suitable to be applied as the upper electrode. As noble metals, also Rh and Ru can be applied thereto other than those mentioned above. Conductive oxides being originally oxidized are also preferable to be the material for the upper electrode. Furthermore, the metals, which are passivated upon the surface thereof, such as Al and Al-alloy, etc., can be applied to be the electrode, since they will not be the insulator due to the fact that the oxidization is stopped only upon the surface thereof.

Figure 10:
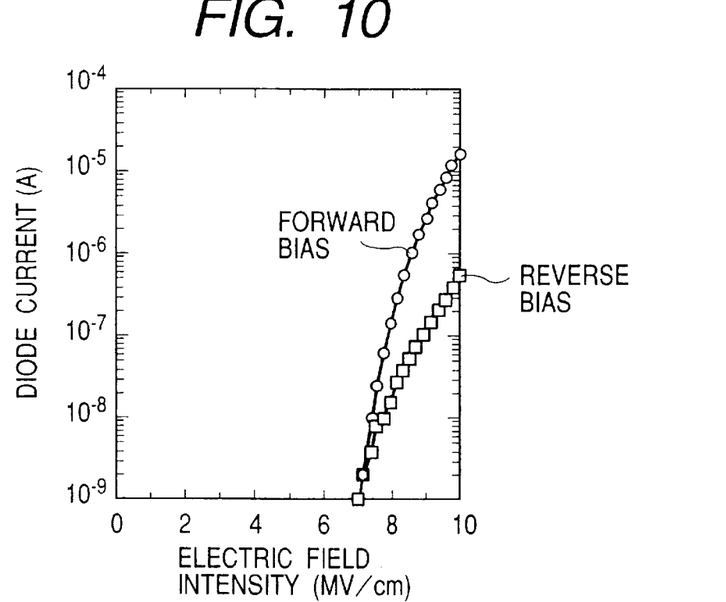
FIG. 10 shows the current-voltage characteristic curve of a thin-film electron source, according to the first embodiment of the present invention.

FIG. 10 shows the measurement of the current-voltage characteristic curve of the thin-film type electron source manufactured in accordance with the present embodiment. The ratio of the reverse direction diode current with respect to the forward direction diode current is 0.034, when applying the electric field of 10 MV/cm where sufficient emission of electron can be obtained. Also, the height of barrier of the insulation layer 12 to the lower electrode 11 and that to the upper electrode are different from each other, then being converted into the case where they are equal to each other, it comes to be 0.66, therefore the symmetry comes up high by heating thereof.

Figure 11:
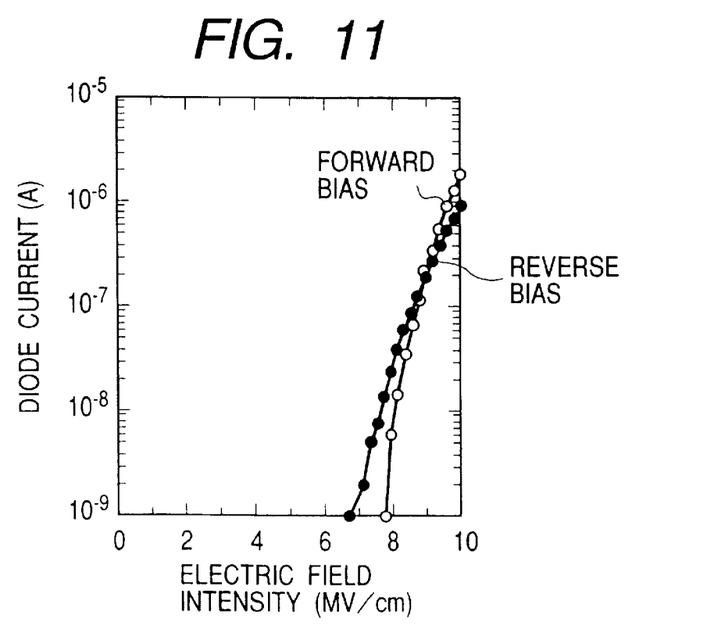
FIG. 11 shows the current-voltage characteristic curve of an other thin-film electron source, according to the first embodiment of the present invention.

Also, FIG. 11 shows the result studied on the asymmetry of the current-voltage characteristic curves of the samples, after heating them within air atmosphere when applying Al—Nd alloy to the material of the upper electrode 13 too, which is in contact with the insulating layer 12. The ratio of the reverse direction diode current to the forward direction diode current is 0.5, i.e., it comes to be high by heating thereof. Further, in this case, the lower electrode 11 and the upper electrode are same in the materials thereof, therefore the height of barrier of the insulating layer 12 to the lower electrode 11 and that to the upper electrode are equal to each other, then such the conversion as was conducted in the cases in the FIGS. 9 and 10 is not necessary, for converting them into the same height of barrier.

Herein, a method for converting the ratio of the reverse direction diode current with respect to the forward direction diode current into the case that those heights of barriers are equal to each other, in the current-voltage characteristics measured will be mentioned, in particular, when the materials are different between the lower electrode 11 and the upper electrode 13, i.e., in a case where the height of barrier of the insulating layer 12 to the lower electrode 11 is different from that to the upper electrode 13. The heights of barriers of the insulating layer 12 with respect to the electrodes 11 and 13 can be estimated by work functions of those materials of electrodes to the vacuum, respectively. The work function of the Al which is main material of the lower electrode 11 is 4.2 eV, while the largest one among those materials which are applied in the present invention, i.e., the work function of Ir and Pt is 5.3 eV (Metal Data Book(Maruzen), published in 1984, p195). On the other hand, the smallest one in the work function is Ti, i.e., 3.9 eV. Since it is already known that the barrier height upon the interface between Al and $Al_2O_3$ is about 2.65 eV, then the barrier heights upon the interface between Ir and $Al_2O_3$ and between Pt and $Al2O_3$ are 3.75 eV and that between Ti and $Al_2O_3$ is 2.35 eV.

Obtaining the amounts of electron which are injected with the respective barrier heights through an. equation of Fower-Nordheim at the same electric field applied onto the insulating layer 12, the ratio of the current injected from the interfaces between Ir and $Al_2O_3$ and between Pt and $Al_2O_3$ with respect to that injected from the interface between Al and $Al_2O_3$ comes to be 0.05. This result is roughly coincident with 0.034 that is the result obtained from the FIG. 10.

Figure 1:
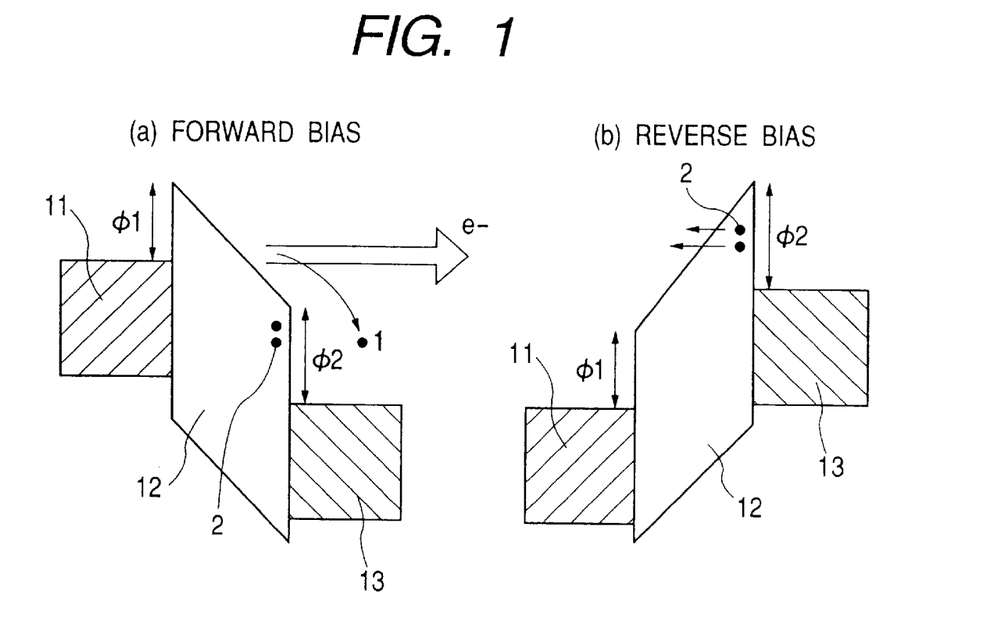
FIG. 1 is a view of the band structure under operating condition of a thin-film electron source, according to the present invention.

A situation of proceeding in the symmetrization of the asymmetry of the current-voltage characteristic curve, as the result of the present embodiment, is shown in the FIG. 1, by means of the band structure of the thin-film type electron source, in a manner of the conception thereof, in comparison with FIG. 4. The electron, being injected into the insulating layer 12 through the Tunnel phenomenon when being applied with the forward direction voltage thereacross, comes to be the electron e which is emitted into the vacuum, the electron 1 which flows into the upper electrode 13, and the electron 2 which is accumulated within the insulating layer 12 in vicinity of the interface between the upper electrode 13. Thereafter, when applying the reverse voltage thereacross, since the asymmetry is improved, the electric field is applied within the insulating layer 12 in the vicinity of the interface between the upper electrode 13, so that it can release the electron 2 accumulated therein.

In this manner, the anodized film constructing the insulating layer 12 is uniformed in the film quality thereof, namely, the asymmetry is improved to be within a predetermined band or region thereof, then the electric field applied to the insulating layer 12 is uniformed (constant in the inclination of the electric field), therefore it is easy to release the accumulated electric charge 3 by reversing the polarity of the driver voltage.

Embodiment 2

Figure 12:
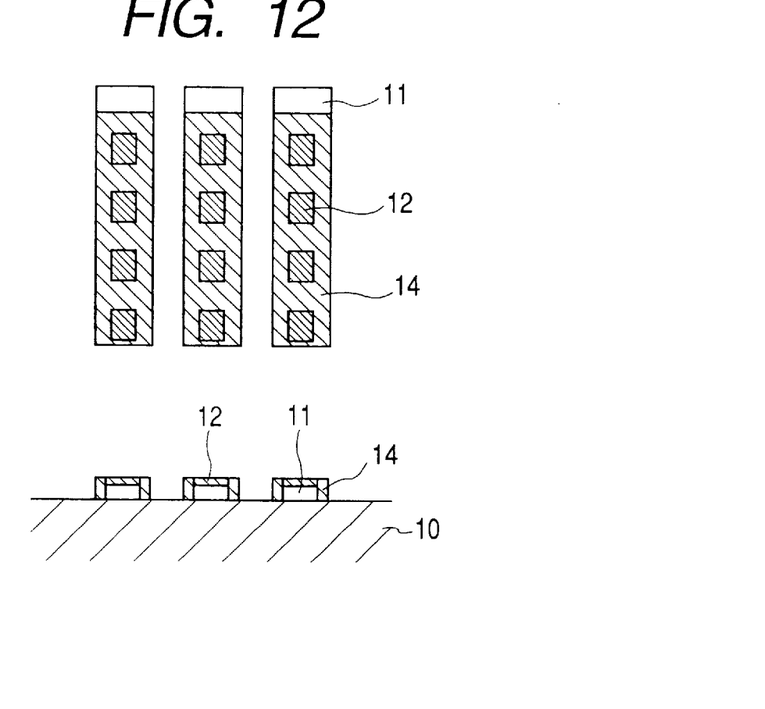
FIG. 12 is a view for showing manufacturing process of a display panel for a display device, according to a second embodiment of the present invention.

An example of a display device using the present invention therein will be explained, by referring to FIGS. 12 to 18. First, a substrate 10 is manufactured as below, on which a matrix of the thin-film type electron source is formed. First of. all, on the substrate 10 of the insulative material, such as glass, is formed an alloy layer of Al—Nd through the sputtering method. The film thickness is set to be 300 nm. This film is pattered into stripes through a photo-lithography and etching thereof, thereby forming the lower electrodes 11. Following to the above, an insulating layer 14 is formed through anodization of the surface of the lower electrodes 11. Herein, the film thickness of the insulating layer 12 is 6 nm. Following to this, a protection insulating layer 14 are formed. This is formed through selectively anodizing the side surface of the lower electrode with thick. Herein, the film thickness thereof is set to be 100 nm (FIG. 12).

Figure 13:
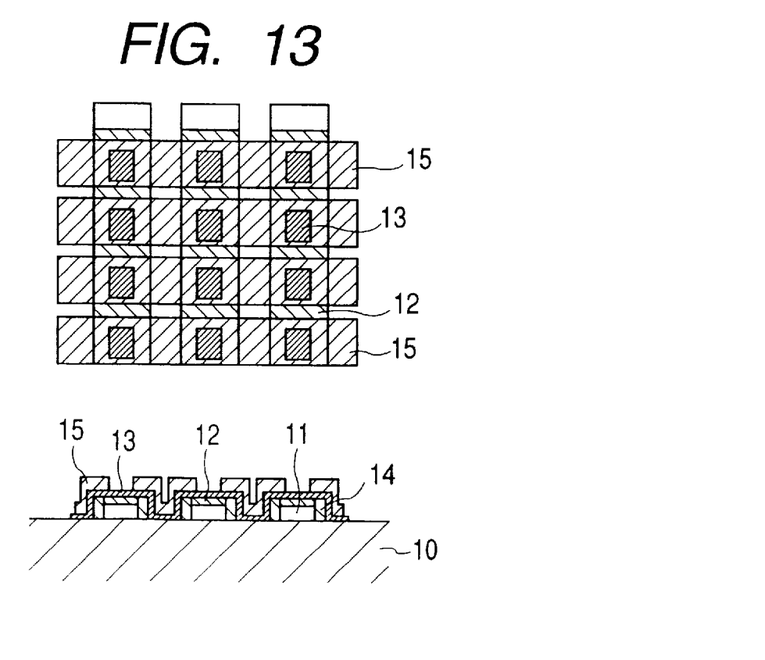
FIG. 13 is a view for showing the manufacturing process of the display panel for the display device, according to the second embodiment of the present invention.

Following to this, the upper electrodes 13 are formed in the form of stripes, in the direction being orthogonal to the lower electrodes 11 through the sputtering method. The upper electrode 13 is made of the three (3) layer, such as Ir, Pt and Au, and they are at 1 nm, 2 nm and 3 nm, in the film thickness thereof, respectively. Lastly, bus lines 15 for the upper electrodes are formed from the Al as being lines for supplying electricity to the upper electrodes 13. In the above, a matrix substrate of the thin-film type electron source is completed (FIG. 13).

Figure 14:
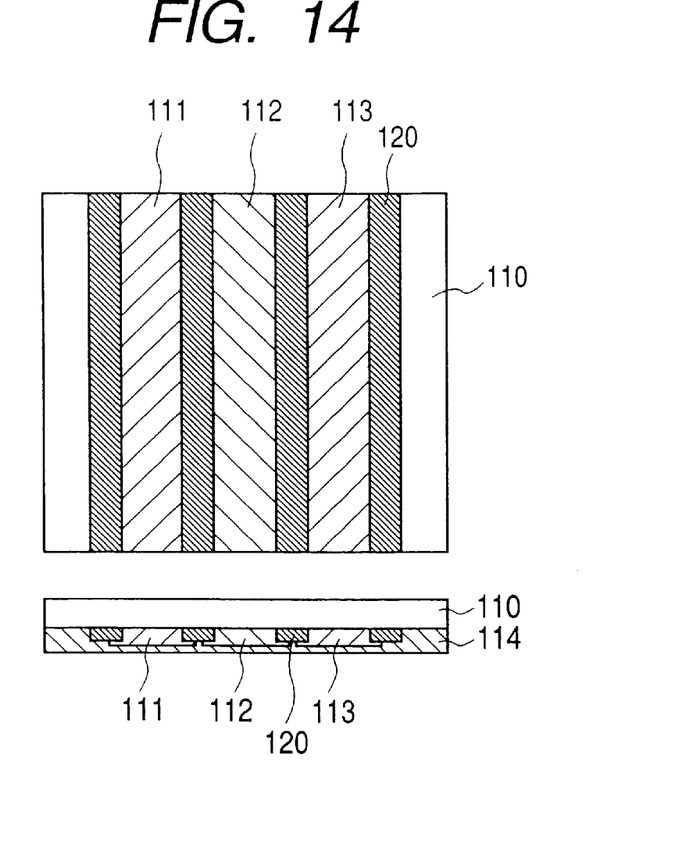
FIG. 14 is a view for showing the manufacturing process of the display panel for the display device, according to the second embodiment of the present invention.

Next, a manufacturing method will be shown on the substrate at the side of display (FIG. 14). As a face plate 110, material such as a transparent glass, etc. is used. First, for the purpose of increasing up a contrast of the display device, a black matrix 120 is formed thereon. After coating a solution, mixing PVA (polyvinyl alcohol) and dichromatic acid ammonium therein, onto the face plate 110 and irradiating ultraviolet rays on a portion thereof, so as to expose portions other than that, with which the black matrix 120 is formed, the black matrix 120 is formed by coating a solution dissolving graphite powder therein onto where unexposed portion thereof is removed and lifting-off of the PVA.

Next, a red-color phosphor 111 is formed. After coating a water solution, in which PVA (polyvinyl alcohol) and dichromatic acid ammonium are mixed into the phosphor powder, onto the face plate 110 and after exposing the portion at which the phosphor should be formed by irradiating the ultraviolet rays thereon, the unexposed portion is removed by flowing out with water. In this manner, the red-color phosphor 111 is patterned. This stripe pattern is only an example thereof, therefore, other than this, of course it does not matter that it is in an "RGBG" pattern, in which every one pixel is formed with four (4) dots neighboring one another, for example, depending upon the design of the display device. The film thickness of the phosphor is set to be around from 1.4 to 2 times of the layer. In the same manner, green color phosphor 112 and blue phosphor 113 are formed. As the phosphor materials, it is possible to use $Y_2O_2S:Eu$(P22-R) for the red color, $Zn_2SiO_4:Mn$ for the green color and ZnS:Ag(P22-B) for the blue color, for example.

Next, after filming thereon with a film of cellulose of nitrate, Al is evaporated upon the face plate 110 as a whole, with the film thickness from 50 nm to 300 nm, thereby forming a metal back 114. This metal back 114 functions as an acceleration electrode. After this, the face plate 110 is heated up to about 400° C. under the air atmosphere, thereby performing thermal decomposition of the organic matters, such as the filming film and the PVA, etc. In this manner, the substrate at the display side is completed.

Figure 15:
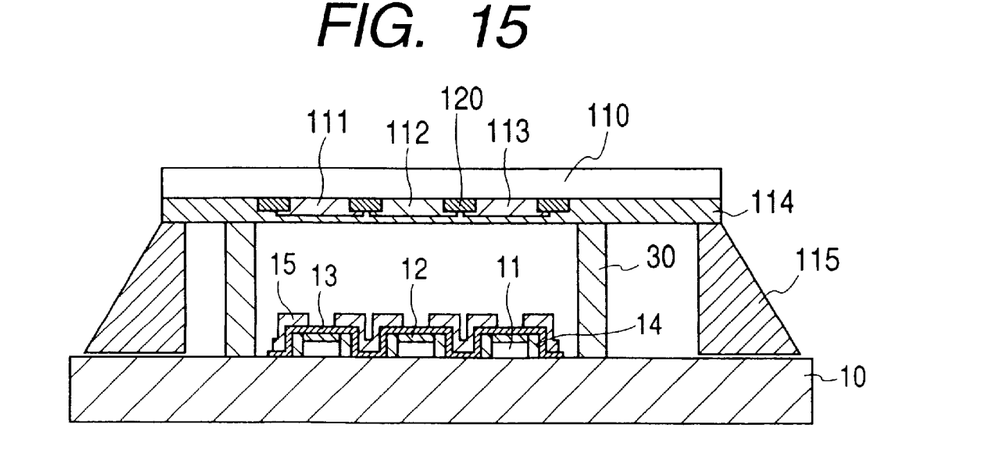
FIG. 15 is a view for showing the manufacturing process of the display panel for the display device, according to the second embodiment of the present invention.

The substrate at the display side manufactured in this manner and the substrate 10 are sealed with using a frit glass 115 therearound and with spacers 30 (FIG. 15). The thickness of the spacers is so set that the distance between the surface plate 110 and the substrate 10 comes to be about from 1 mm to 3 mm.

Herein, though the support of the spacer is provided for every dots emitting the lights of R (red), G (green) and blue (B), i.e., three (3) lines of the upper electrodes, however the number (or density) of the supports can be reduced down, as far as the mechanical strength thereof can be endurable with. In manufacturing of the spacers 30, in the insulating plates of glass or-ceramics, being from 1 mm to 3 mm in thickness thereof, bores or holes at desire are machined through a sandblast method, etc., for example.

Sealing with using the frit glass 115 is conducted under the atmosphere including oxygen therein, for removing the binder contained in a paste of the frit glass through oxidization thereof. Though the temperature being different depending upon the kind of the frit glass 115, it is within a range from 350° C. to 450° C. Accordingly, performing the sealing with using the frit glass, at the same time, also the asymmetry of the current-voltage characteristic curve of the insulating layer is improved, so as to improve the symmetrization thereof, thereby being effective in productivity thereof.

Exhaust of air is treated on the sealed panel so that the vacuum comes to be around $10^{-7}$Torr therein, and the sealed panel is tipped off. In this manner, the display panel with using the thin-film electron source is completed.

In this manner, with the present embodiment, the distance between the face plate 110 and the substrate 10 is rather long, such as about 1 mm to 3 mm, therefore it is possible to bring the acceleration voltage which is applied to the metal back 114 to be high, such as 3 KV to 6 KV. Accordingly, as was mentioned in the above, it is possible to user the phosphor materials for use in a cathode ray tube (CRT) as the phosphor.

Figure 16:
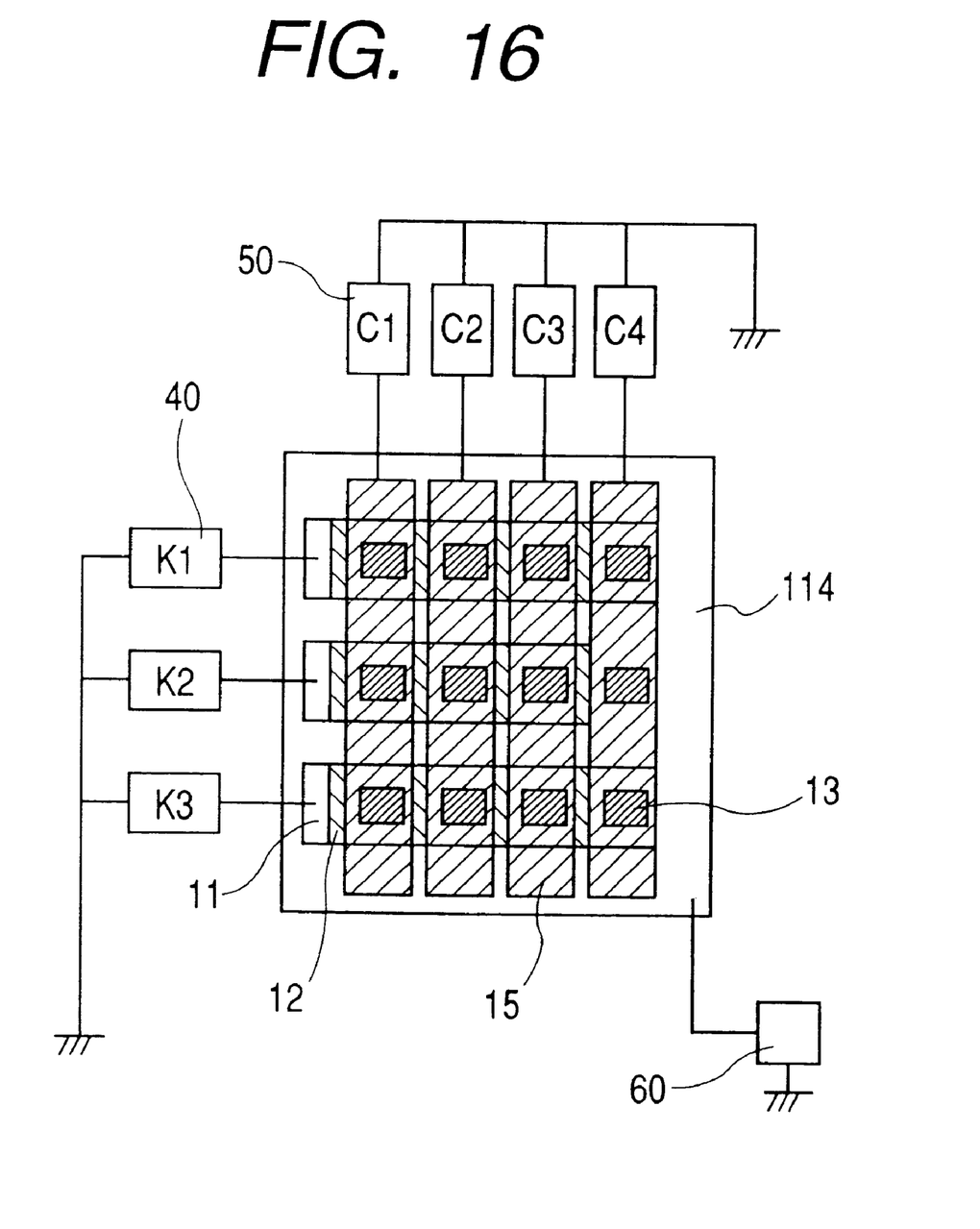
FIG. 16 is a circuit diagram between the display panel for the display device, according to the second embodiment of the present invention and a driver circuit therefor.

FIG. 16 shows a circuitry diagram between the display panel manufacture in such the manner and the driver circuit thereof. The lower electrodes 11 are connected to a lower-electrode driver circuit 40, while an upper electrode bus lines 15 to an upper electrode driver circuit 50. It is assumed that an intersecting points between the lower electrode 11 Kn at the number n and the upper electrode bus line 15 Cm at the number m is indicated by (n,m). To the metal back 114 is always applied the acceleration voltage 60, such as about from 3 KV to 6 KV.

Figure 17:
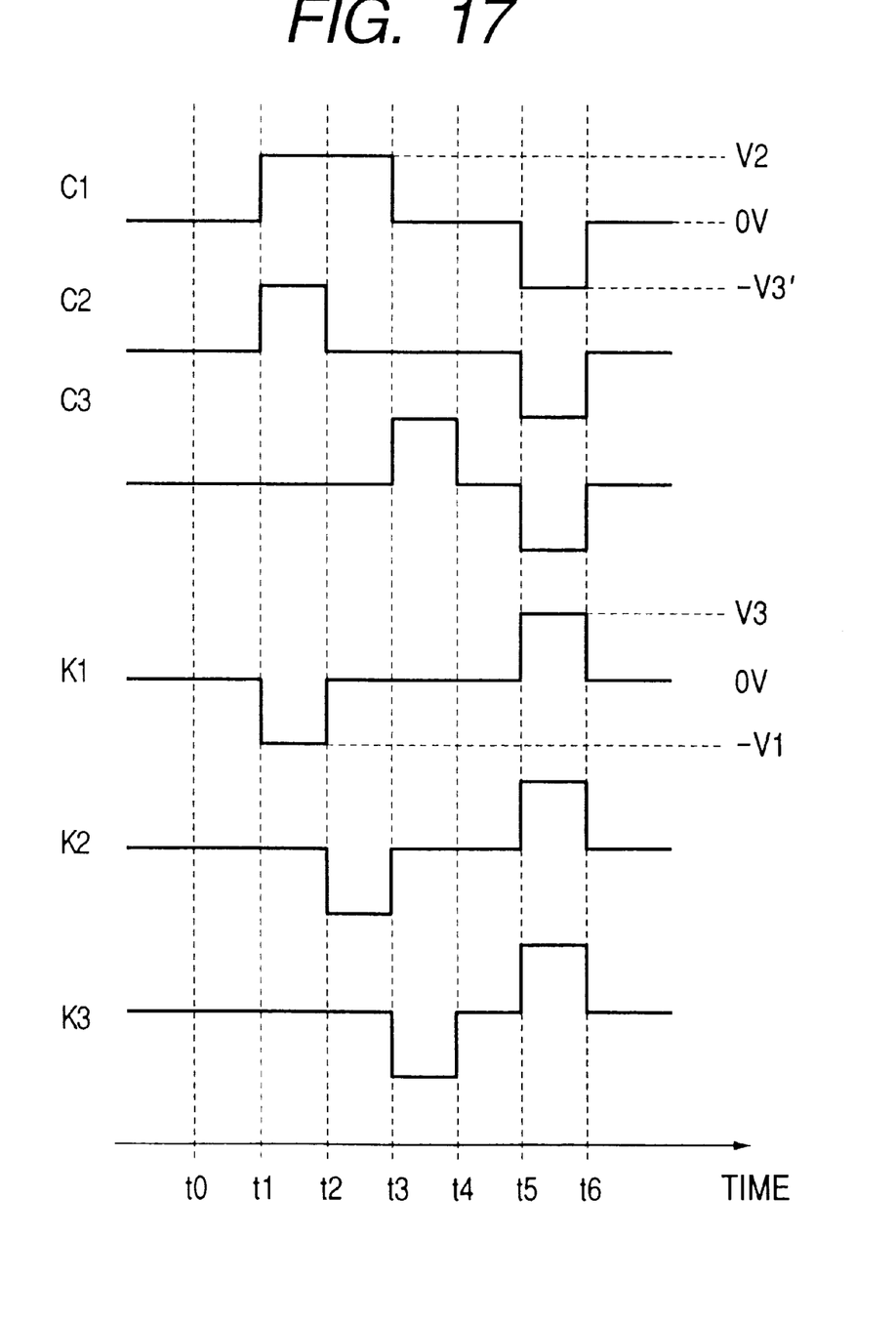
FIG. 17 shows an example of voltage wave-forms generated by the driver circuit of the display device, according to the second embodiment of the present invention.

FIG. 17 shows an example of wave-forms of voltages which are generated in the driver circuit. At a time t0, since the voltage on every electrodes is zero (0), no electron is emitted,therefore the phosphor do not emit lights therefrom. At a time t1, a voltage −V1 is applied to the lower electrode 11 K1, while a voltage +V2 to the upper electrode bus lines 15 C1 and C2. Since a voltage (V1+V2) is applied across the lower electrode 11 and the upper electrode 13 at the intersectingpoints (1,1) and (1,2), electrons are emitted from the thin-film type electron source into the vacuum by setting the (V1+V2) to be equal to or larger than a threshold voltage for electron emission. The electron emitted therefrom, after being accelerated by the acceleration voltage 60 which is applied to the metal back 114, enters into the phosphor, so as to emit the light therefrom. At a time t2, when applying the voltage −V1 to the K2 of the lower electrode 11 while the voltage V2 onto the C1 of the upper electrode bus line 15, the intersecting point (2,1) is lighten in the same manner. By changing the signal applied onto the upper electrode bus lines 15 in this manner, it is possible to display a desired image or information thereon. Also, by changing the amplitude of the applied voltage V1 onto the upper electrode bus lines 15, appropriately, it is possible to display the image having a gradation therewith. Herein, an application of the reversed voltage is conducted by applying V3 to all of the lower electrodes and −V3' to all of the upper electrodes after applying the −V1 to all of the lower electrodes. It is so adjusted that V3+V3' comes to be same to about V1+V2. Due to this, the electric charge accumulated in the vicinity of the interface of the insulating layer between the upper electrode 13 is released, therefore it is possible-to suppress the deterioration of the insulating layer.

Figure 18:
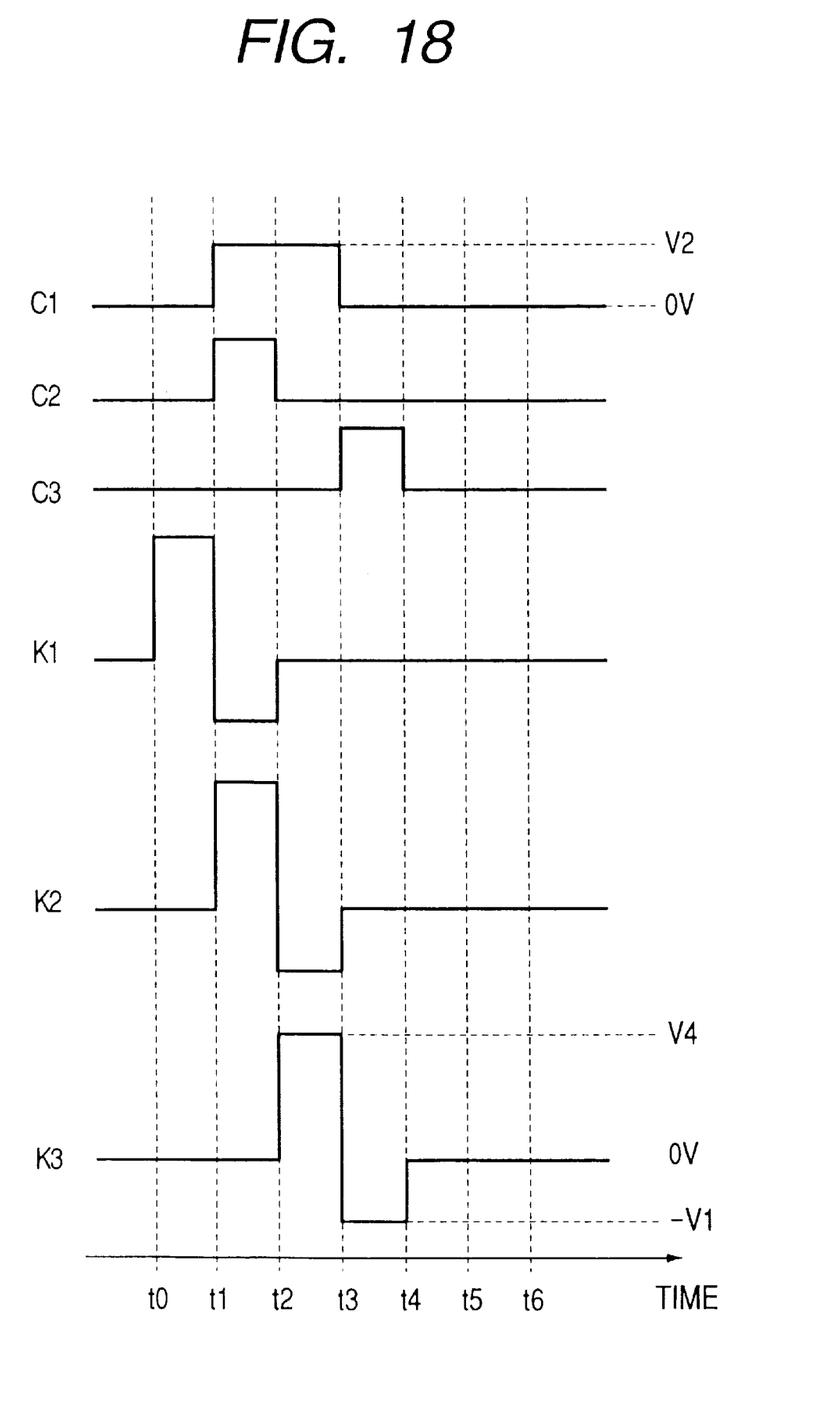
FIG. 18 shows other example of voltage wave-forms generated by the driver circuit of the display device, according to the second embodiment of the present invention.

FIG. 18 shows another example of the wave-forms of voltages which are generated in the driver circuit. Herein, a reversed voltage V4 is applied to each of the lower electrodes 11 before applying the driving voltage −V1 thereto.

What is claimed is:

1. A thin-film type electron source having a laminated structure of a lower electrode, an insulating layer and an upper electrode, for emitting electron from a surface of said upper electrode into a vacuum, upon application of voltage between said lower electrode and said upper electrode, in a polarity thereof so that said upper electrode is positive in the voltage, being characterized in that said lower electrode is made from Al-alloy adding metal into Al which can be anodized, while said insulating layer is made from anodized film which is anodized upon surface of said lower electrode, wherein a ratio of a reverse direction diode current when applying an electric field of 10 MV/cm thereacross in a reverse direction, with respect to a forward direction diode current when applying an electric field of 10 MV/cm thereacross in a forward direction so as to cause emission of electron therefrom, is equal to or greater than 0.12, when it is converted into a case where height of barrier of said insulating layer to said lower electrode is equal to that of said upper electrode.

2. A thin-film type electron source as defined in the claim 1, wherein the metal which can be anodized, being added into said lower electrode, is at least one kind selected from a group including Nd, Zr, Ta, Ti, Nb and Hf.

3. A thin-film type electron source as defined in the claim 1, wherein said upper electrode is made of at least one kind selected from a group including Ir, Pt, Au, Ru, Rh, Al, Al-alloy, Ti, Cr, and conductive ITO, ZnO, $Sno_2$, $IrO_2$ and PdO.

4. A thin-film type electron source as defined in the claim 1, wherein the ratio of said reversed direction diode current with respect to said forward direction diode current is equal to or greater than 0.5.

5. A thin-film type electron source as defined in the claim wherein the metal which can be anodized, being added into said ower electrode, is at least one kind selected from a group ncluding Nd, Zr, Ta, Ti, Nb and Hf.

6. A thin-film type electron source as defined in the claim wherein said upper electrode is made of at least one kind elected from a group including Ir, Pt, Au, Ru, Rh, Al, Al-alloy, Ti, Cr, and conductive ITO, ZnO, $Sno_2$, $IrO_2$ and PdO.

7. A display device comprising: a thin-film type electron source being defined in claim 1; a driver circuit for driving said thin-film type electron source; and a fluorescence surface which emits lights by being energized with electrons emitted from said thin-film type electron source.

8. A display device as defined in the claim 7, wherein said driver circuit applies pulse voltages of positive and negative between said lower electrode and said upper electrode.

9. A display device as defined in the claim 7, wherein a substrate on which said thin-film type electron source is provided and a substrate on which said phosphor screen is provided are bonded to each other through frit glass.

10. A display device comprising: a thin-film type electron source; a driver circuit for driving said thin-film type electron source; and a phosphor screen which emits lights by being energized with electrons emitted from said thin-film type electron source, wherein said thin-film type electron source has a laminated structure of a lower electrode, an insulating layer and an upper electrode, so that it emits electron from a surface of said upper electrode into a vacuum, upon application of voltage between said lower electrode and said upper electrode, in a polarity thereof so that said upper electrode is positive in the voltage, said lower electrode is made from Al-alloy adding metal into Al which can be anodized, while said insulating layer is made from anodized film which is anodized upon surface of said lower electrode, a substrate on which said thin-film type electron source is provided and a substrate on which said phosphor screen is provided are pasted to each other through frit glass, and said bonding is conducted through heating said two (2) substrates under an atmosphere from 350° C. to 450° C. including oxygen therein.

11. A display device as defined in the claim 10, wherein said driver circuit applies pulse voltages of positive and negative between said lower electrode and said upper electrode.

* * * * *